US006543224B1

(12) United States Patent
Barooah

(10) Patent No.: US 6,543,224 B1
(45) Date of Patent: Apr. 8, 2003

(54) SYSTEM AND METHOD FOR CONTROLLING SHAPE MEMORY ALLOY ACTUATORS

(75) Inventor: Prabir Barooah, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/059,880

(22) Filed: Jan. 29, 2002

(51) Int. Cl.[7] ............................................. F01B 29/10
(52) U.S. Cl. ............................................. 60/527; 60/528
(58) Field of Search .................................. 60/527, 528

(56) References Cited

U.S. PATENT DOCUMENTS 5,226,619 A * 7/1993 Alger
5,270,643 A * 12/1993 Richardson et al. .... 324/458 R
6,019,113 A * 2/2000 Allston et al. .................. 137/1
6,318,070 B1 11/2001 Rey et al. .................. 60/226.3

OTHER PUBLICATIONS

Carrie A. Dickinson, et al., "Feedback Control Using Shape Memory Alloy Actuators", Journal of Intelligent Material Systems and Structures, Apr., 1998, vol. 9, pp. 242–250.

Glenn V. Webb, et al., "Hysteresis Modeling of SMA Actuators for Control Applications", Journal of Intelligent Material Systems and Structures, Jun., 1998, vol. 9, pp. 432–448.
Robert B. Gorbet, et al., "A Dissipativity Approach to Stability of a Shape Memory Alloy Position Control System", IEEE Transactions on Control Systems Technology, Jul., 1998, vol. 6 No. 4, pp. 554–562.
Koji Ikuta, et al., "Shape Memory Alloy Servo Actuator System with Electric Resistance Feedback and Application for Active Endoscope" IEEE, 1988, pp. 427–430.

* cited by examiner

Primary Examiner—Hoang Nguyen
(74) Attorney, Agent, or Firm—McCormick, Paulding & Huber LLP

(57) ABSTRACT

A system and method of controlling a shape memory alloy (SMA) actuator comprises supplying maximum control voltage to an SMA actuator where an object having a position to be controlled by the SMA actuator were to move toward a target position upon supply of non-zero control voltage, and the instantaneous actual position of the object is at a distance above a predetermined threshold from the target position. A variably controlled voltage is supplied to the SMA actuator between the maximum voltage and about zero voltage where the object to be controlled were to move toward the target position upon supply of the variably controlled voltage, and the instantaneous actual position of the object is at a distance below the predetermined threshold from the target position.

12 Claims, 4 Drawing Sheets

SYSTEM AND METHOD FOR CONTROLLING SHAPE MEMORY ALLOY ACTUATORS

FIELD OF THE INVENTION

This invention relates generally to control systems, and more specifically to a system and method of controlling shape memory alloy actuators.

BACKGROUND OF THE INVENTION

Shape memory alloy (SMA) actuators have the potential for use in a wide range of actuator applications including space stations, automotive components, surgical devices and robotic arms. Such SMA actuators are described more fully in U.S. Pat. No. 6,318,070 B1 issued on Nov. 20, 2002 and entitled "Variable Area Nozzle For Gas Turbine Engines Driven By Shape Memory Alloy Actuators"; U.S. patent application Ser. No. 09/824,419 filed Apr. 2, 2001 and entitled "Variable Area Nozzle For Gas Turbine Engines Driven By Shape Memory Alloy Actuators"; and U.S. patent application Ser. No. 09/517,938 filed Mar. 3, 2000 and entitled "Shape Memory Alloy Bundles And Actuators", the disclosures of which are herein incorporated by reference.

Resistive heating is used as the means to induce martensite to austenite transformation in the material, which produces recovery stress. This stress can be used for actuation. By intelligently controlling the power input to the SMA actuator, the required temperature and hence the required amount of stress can be achieved. Since the power requirements may vary subject to such unknowns as ambient temperature, hysteresis and material degradation, open loop control (i.e., supplying predetermined power for a specific desired position) does not work; one has to resort to closed loop feedback control.

A closed loop feedback control system is required to achieve this objective. The challenge in devising an effective control algorithm for such a position control system is the nonlinear hysteretic behavior of SMA, which renders conventional linear control laws such as proportional integral derivative (PID) less effective. Conventional (PID type) SMA controllers have been applied to thin SMA wires. Because of the small size of the SMA wires, and therefore the consequent fast heating/ cooling behavior of the wires, PID can be employed with reasonable success. However, a large bundled cable actuator such as, for example, an actuator having 266 wires of 0.02" diameter each, cannot be controlled by conventional PID type feedback control.

Another drawback is the bandwidth limitation of SMA actuators usually as the size (mass) increases, the dynamic response of the SMA becomes poorer. The high thermal energy input necessary to heat up the SMA to realize the necessary strain impedes fast actuation. In situations where active cooling is not an option for the control scheme, the hysteresis of the material makes it extremely difficult to quickly correct errors because of temperature overshoot. Once the SMA contracts more than necessary (too much power is supplied), it takes a long time to cool off sufficiently so that its length assumes the desired value. This imposes further restriction on the control algorithm for minimizing the overshoot error.

A powerful control approach is to employ a mathematical model of the hysteresis behavior of shape memory material to determine the control action. Since material property is subject to change over time, such models need to be updated continuously through real-time measurements and adaptive algorithms. A drawback with such an approach is that it is complex and computationally intensive, and consequently time consuming and expensive to implement.

In view of the foregoing, it is a general object of the present invention to provide a method of controlling an SMA actuator which avoids the above-described drawbacks associated with prior art SMA actuator controllers.

SUMMARY OF THE INVENTION

In a first aspect of the present invention, a method of controlling a shape memory alloy (SMA) actuator comprises the steps of supplying maximum control voltage to an SMA actuator where an object having a position to be controlled by the SMA actuator were to move toward a target position upon supply of non-zero control voltage, and the instantaneous actual position of the object is at a distance above a predetermined threshold from the target position. A variably controlled voltage is supplied to the SMA actuator between the maximum voltage and about zero voltage where the object to be controlled were to move toward the target position upon supply of the variably controlled voltage, and the instantaneous actual position of the object is at a distance below the predetermined threshold from the target position.

In a second aspect of the present invention, a method of controlling an SMA actuator comprises the steps of providing an SMA actuator for moving an object to a predetermined target position. A maximum control voltage is supplied to the SMA actuator where an object having a position to be controlled by the SMA actuator were to move toward a target position upon supply of nonzero control voltage, and the instantaneous actual position of the object is at a distance above a predetermined threshold from the target position. A variably controlled voltage is supplied to the SMA actuator between the maximum voltage and about zero voltage where the object to be controlled were to move toward the target position upon supply of the variably controlled voltage, and the instantaneous actual position of the object is at a distance below the predetermined threshold from the target position.

In a third aspect of the present invention, an SMA actuator control system comprises an SMA actuator including SMA wires and at least one position sensor. The SMA actuator is to be coupled to an object having a position to be moved by the SMA actuator. The system includes means for supplying maximum control voltage to the SMA actuator where the object having a position to be controlled by the SMA actuator were to move toward a target position upon supply of a non-zero control voltage, and the instantaneous actual position of the object is at a distance above a predetermined threshold from the target position. The system further includes means for supplying a variably controlled voltage to the SMA actuator between the maximum voltage and about zero voltage where the object to be controlled were to move toward the target position upon supply of the variably controlled voltage, and the instantaneous actual position of the object is at a distance below the predetermined threshold from the target position.

An advantage of the present invention is that the power to the SMA actuator is cut off prior to the controlled object reaching the target position so as to prevent overshoot of the target position.

These and other advantages of the present invention will become more apparent in the light of the following detailed description and accompanying figures.

DETAILED DESCRIPTION OF THE PREFERRED EMBODIMENT

Figure 1:
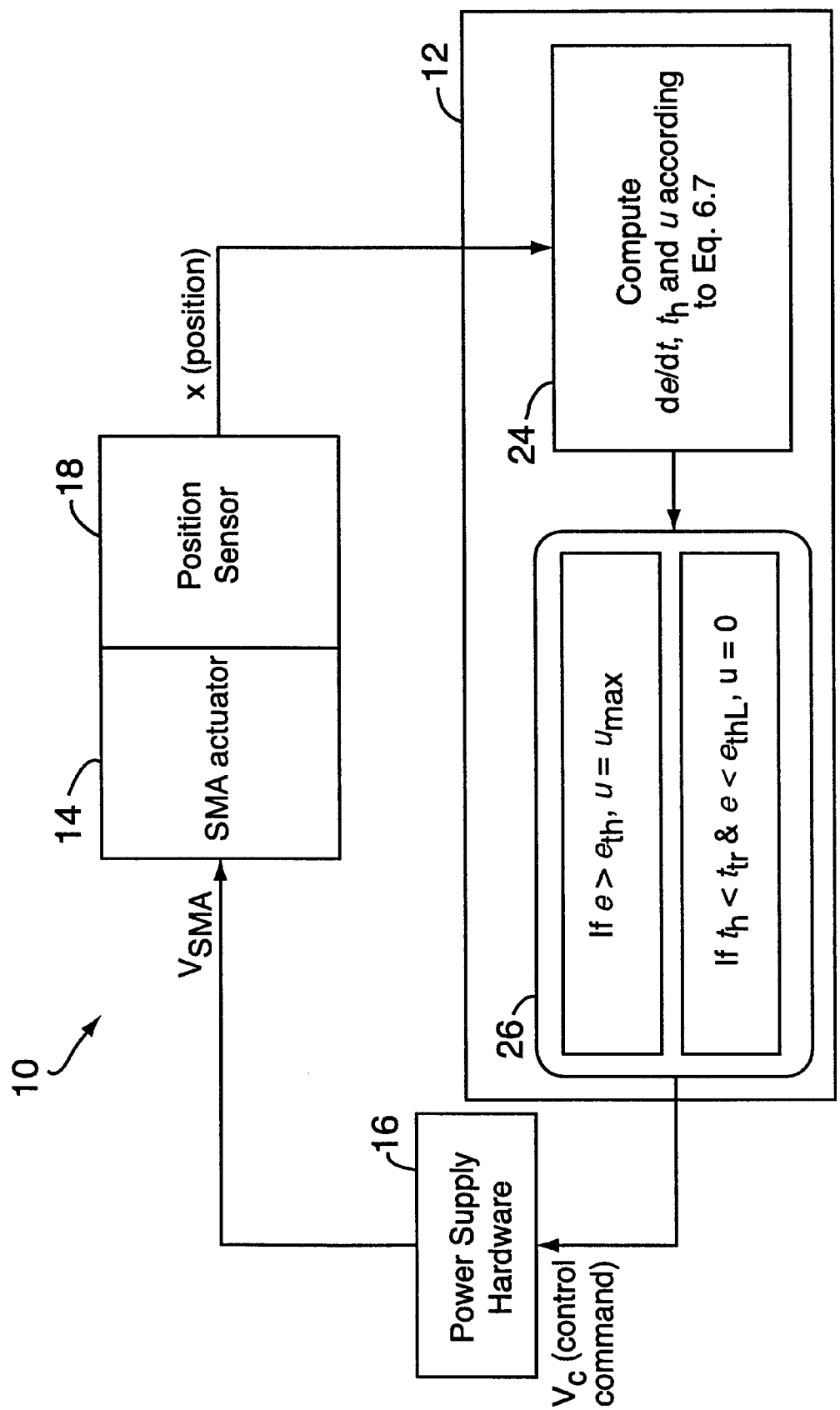
FIG. 1 is a flow diagram of a process of controlling an SMA actuator in accordance with the present invention.
Figure 2:
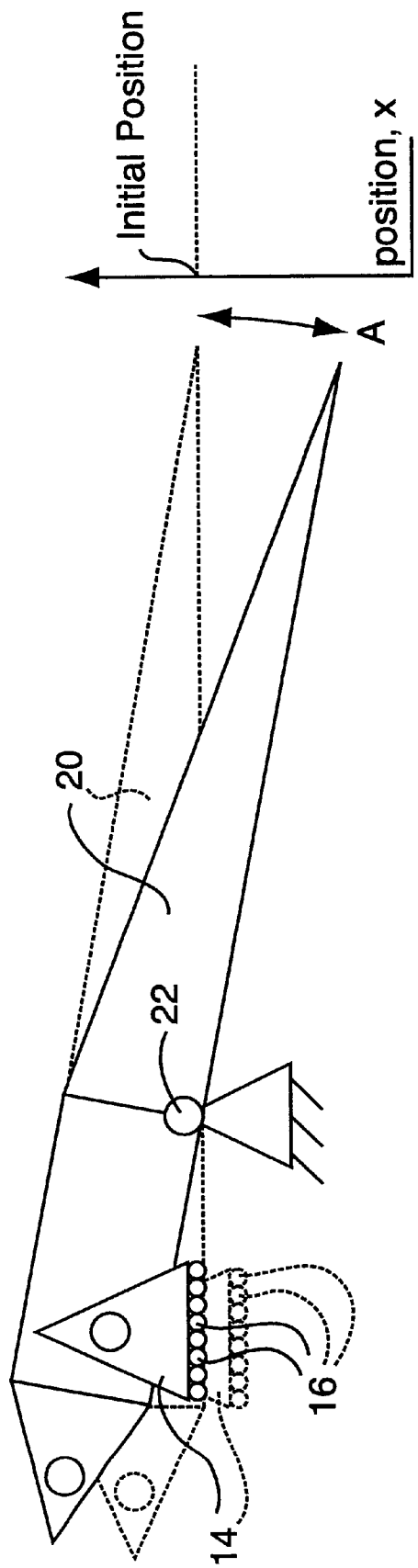
FIG. 2 schematically illustrates an SMA actuation system where SMA bundled cable actuates a mechanical member by means of the process of FIG. 1.

A system and method in accordance with the present invention for controlling an SMA actuator is illustrated by means of a combination structure/flow diagram as shown in FIG. 1 and a structural diagram shown in FIG. 2. By way of example, the system and method is explained with reference to an SMA system 10 having a control processor 12, an SMA actuator 14 including SMA wires or cables, a power supply 16 and position sensors 18. It should be understood, however, that other actuators may be substituted and other applications used without departing from the scope of the present invention. For example, any application where shape memory effect is used to produce a measurable output (e.g., displacement of an end effector) can be used with the control method of the present invention.

Turning again to FIGS. 1 and 2, the processor 12 has an input coupled to the position sensors 18, and an-output coupled to the power supply 16 for sending a control command voltage $V_c$ to the power supply, which in turn, supplies a voltage $V_{SMA}$, and corresponding current to the SMA cables of the SMA actuator 14 as a function of the position of the object measured by the position sensors 18. The actual voltage $V_{SMA}$ across the SMA as supplied by the power supply 16 is proportional to the control voltage $V_c$. For example, the relationship that may be employed is $V_{SMA}=8*V_c$, but may be a different proportion depending on the type of power supply. The control law is, however, independent of the specific constant of proportionality.

The SMA actuator system 10 shown by way of example in FIG. 2 controls the position of point A of a mechanical linkage 20 in the presence of load M (hinge moment) by metering (i.e., variably controlling) the heat supplied to the SMA actuator 14. The SMA actuator 14 is initially strained in the base state. Once heated, recovery stress is developed which is used for actuation of the linkage 20. A control input is the voltage $V_{SMA}$ to the SMA actuator 100, and the output of the actuator is the position x of point A. Point A of the mechanical linkage 20 is to be moved to a predetermined position $x_d$ in the smallest amount of time with minimum error. As a matter of convention, the position x is so defined that the initial position is larger in value than that of the target position.

Terminology to be used in explaining control of the SMA actuator 14 by the system and method in accordance with the present invention is as follows:

x=instantaneous actual position of point A of the mechanical linkage 20 (inch);

$x_d$=desired or target position of point A (inch)

e=position error=$x-x_d$ (inch);

de/dt=time derivative of the measured position error (inch/sec);

$x_d^c$=fictitious position, computed from an adaptive algorithm (inch);

$e_{th}$=error threshold switching level for control method between maximum power and variably controlled or metered power (inch);

$K_p$=proportional gain;

$K_d$=derivative gain;

γ=adaptation exponent;

$t_h$=time to hit target (second);

$t_{tr}$=threshold value for th (second)

$e_{thL}$=error threshold to be used in deciding to cut off power when the time to hit $t_h$ is lower than $t_{tr}$; $V_C(t)$=control command (command voltage to the power supply);

$V_{cmax}$=maximum control command voltage to the power supply;

$V_{SMA}(t)$=voltage applied across the SMA actuator;

$V_{SMA}$ $V_C$;

$V_{max}$=maximum voltage that can be applied across the SMA actuator by the power supply hardware.

If the positional error detected by the position sensors 18 is large, it has been discovered that the best course of action is to supply maximum power to the SMA actuator 14. Hence, if the position error e is greater than a threshold value $e_{th}$, maximum power or voltage $V_c$ is supplied to the SMA actuator 14. If the error is negative (i.e., the target position $x_d$ is overshot), the supplied power or voltage $V_c$ is set to zero.

Figure 3:
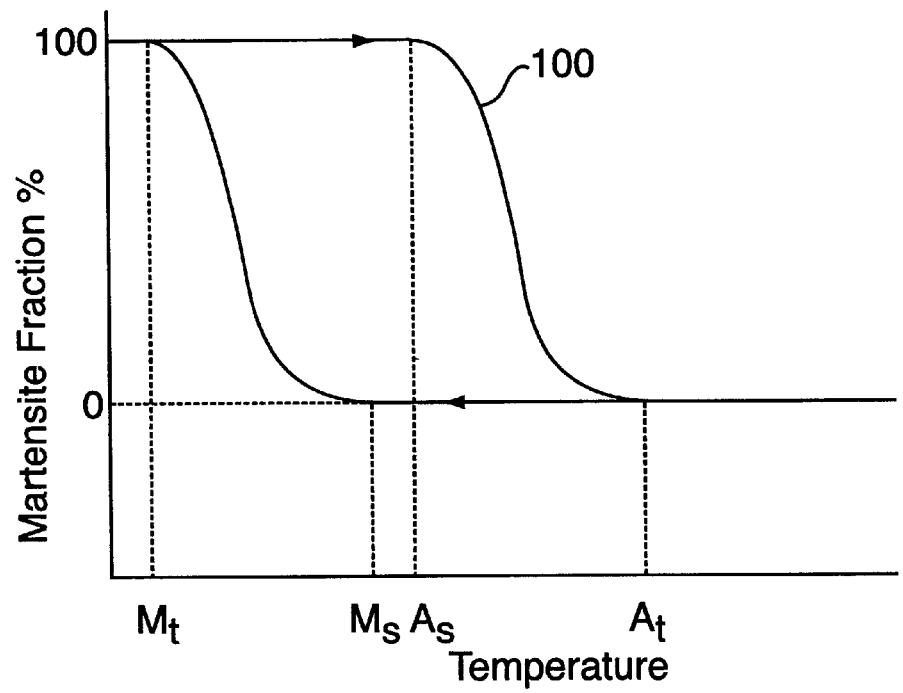
FIG. 3 is a graph of the relationship of strain vs. temperature of typical SMA material to illustrate the material'hysteretic behavior.

When the instantaneous actual position x of point A of the mechanical linkage 20 is very close to the desired or target position $X_d$, the current supplied to the SMA wires 16 should be reduced intelligently, and should be cut off before the target is reached by the end effector, otherwise the temperature of the SMA wires continues to increase for a short time even after the current has been cut off (thermal inertia), and the desired position is overshot. If the end effector overshoots the desired position, it takes a long time to cool and come back to that position due to hysteresis in the SMA strain vs. temperature characteristics, as shown by the hysteresis curve 100 in FIG. 3. When the position error is decreasing, a "time to hit" $t_h$ is also predicted at every instant, based on the local gradient ($t_h$=error/error derivative). If the time to hit $t_h$ is smaller than a threshold value $t_{tr}$, while the error is also very small (smaller than a low threshold value of $e_{thL}$), the control voltage $V_c$ and corresponding current to the SMA actuator 14 is set to 0.

When none of these two conditions are satisfied, i.e., when the measured instantaneous actual position x of point A of the mechanical linkage 20 is close to the target position $x_d$ but has not overshot it, the control voltage $V_{SMA}(t)$ and corresponding current to the SMA actuator 14 has to be continuously variably controlled. The control law is given by the following equations:

$$V_c = V_{cmax} \text{ when } e > e_{th} \quad (1)$$

$$V_c(t) = \left[ K_p(x - x_d^c) + K_d \frac{de}{dt} \right], e_{th} > e > 0 \quad (2)$$

$$V_c(t) = 0 \text{ when } e < 0 \quad (3)$$

where the quantities are given by:

$$\frac{dx_d^c}{dt} = \gamma(x - x_d), \; e > 0 \quad (4)$$

$$\frac{dx_d^c}{dt} = 0, \; e < 0 \quad (5)$$

The control law is similar to a PI (proportional-integral) controller, except that the proportional part is not proportional to the measured error $x-x_d$, but to a fictitious error $x-x_d^c$. The value of $x_d^c$ is updated by the estimation law in the fourth equation. The logic is that if x is less than $X_d$, $x_d^c$ should decrease, but otherwise should remain constant. Dickinson and Wen had first suggested this way of adaptation. However, in their method, the adaptation was not turned off when error became negative. In accordance with the present invention, it is always kept on. Moreover, their control method did not include the derivative term. It has been discovered that the derivative term reduces the overshoot error by decreasing the control input when the error is decreasing fast.

In operation as shown in FIG. 2, the bundled cable SMA actuator 14 is used to move the mechanical linkage 20 hinged at one end 22 while an opposing load is applied with a pneumatic piston-cylinder assembly. As previously mentioned, the operation includes commanding the tip A of the mechanical linkage 20 to move to a specified target position $X_d$. The metrics of performance of the controller are how fast point "A" of the mechanical linkage 20 reaches the target position $x_d$ with how little overshoot and how well the position is maintained once it is reached. Constant air pressure is applied to maintain constant load throughout the operation. The SMA wires 14 are preheated to, for example, 80° F. prior to commencing the operation. As shown in FIG. 1, the processor 12 receives input signals from the position sensors 18 indicative of the instantaneous actual position x of point A of the mechanical linkage 20. As shown in block 24, the processor 12 employs the position signals to compute de/dt, $t_h$, and u or $V_c$ according to the above equations for generating the control voltage signal $V_{SMA}(t)$ for controlling the SMA wires 16 of the SMA actuator 14. However, as shown in block 26, if $e > e_{th}$, then $u = u_{max}$ (i.e., $V_{SMA} = V_{MAX}$), and if $t_h < t_{tr}$ and $e < e_{thL}$ then u=0 (i.e., $V_c(t)=0$).

Figure 4:
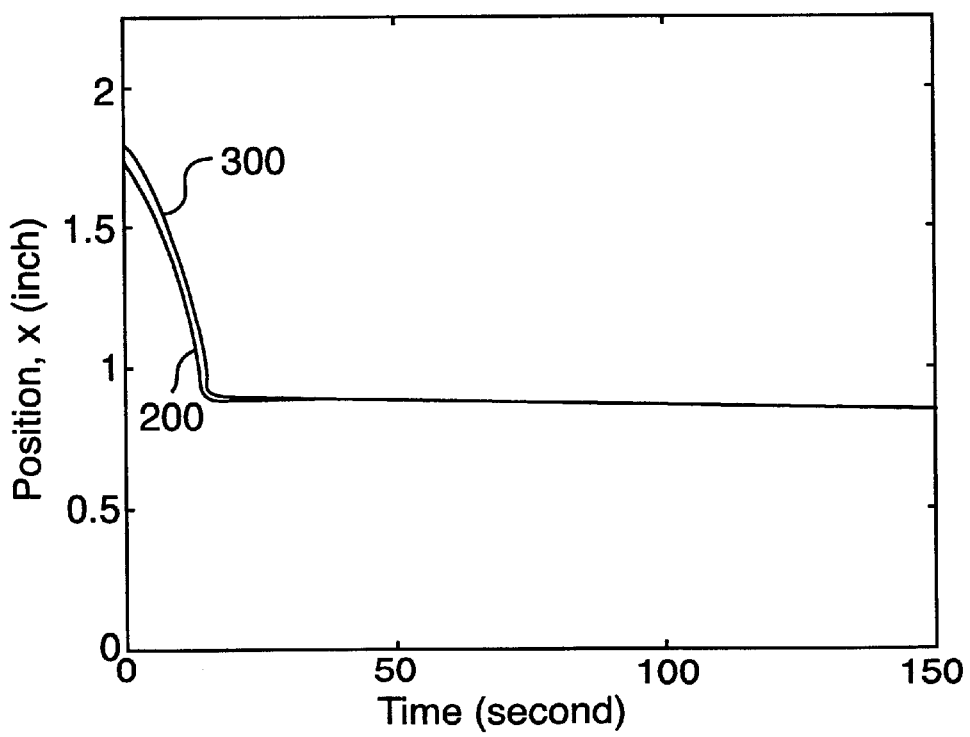
FIG. 4 is a graph of the response of the mean flap position for a step input command for both a conventional PID and the process of FIG. 1.
Figure 5:
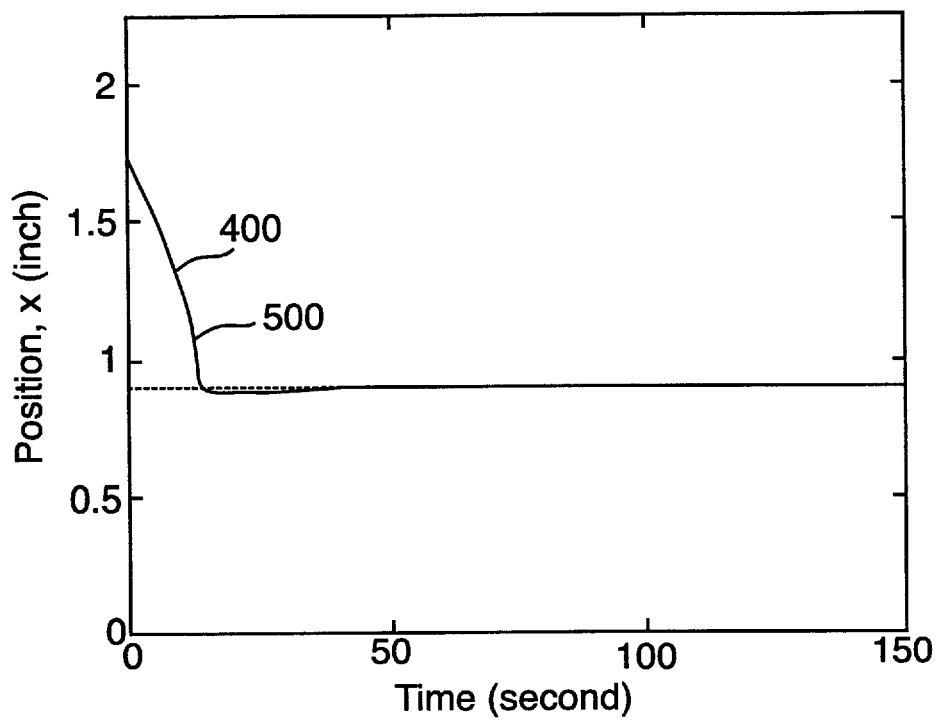
FIG. 5 is a graph illustrating SMA controller performance by the process of FIG. 1 with two different sets of controller parameters.

FIG. 4 shows a curve 208 indicative of the performance of the proposed control method in accordance with the present invention when point A of the mechanical linkage 20 is commanded to travel from position x=1.7 to $x_d$=0.9 inches. For comparison, FIG. 4 also shows a curve 300 indicative of the performance of a conventional PID controller. The gains of the PID controller are tuned for this particular case. It is seen that the method in/accordance with the present invention performs comparably to the PID. However, its strength lies in its robustness which is demonstrated in FIG. 5. FIG. 5 compares the performance of the control method embodying the present invention in a step input test for two very different sets of gains. In both cases the SMA actuator 100 is commanded to move point A of the mechanical linkage 20 from position x=1.7 to $x_d$=0.9 inches. Case 1 corresponds to the controller proportional or gain term constant $K_p$=1.625, the derivative or difference term constant $K_d$=2.5 and the adaptation exponent term $\gamma$=0.02. Case 2 refers to controller constants $K_p$=0.0625, $K_d$=35 and $\gamma$=1. The first set of values are the well-tuned gains derived from previous tests, whereas in the second set, the exponent $\gamma$ is made larger. The values $t_{tr}$, $e_{th}$ etc. are kept the same for both cases. Curve 400 is indicative of the instantaneous actual position x as a function of time for case 1, and curve 500 is indicative of the instantaneous actual position x as a function of time for case 2. It is readily seen from FIG. 5 that the curves 400 and 500 generally overlap and are indistinguishable from one another, thus indicating that the controller works equally well in these cases though the gains are different. This shows that the controller performance is less sensitive to the gains. The low sensitivity of performance to tuning is due to the logic checks in the control method embodying the present invention.

Figure 6:
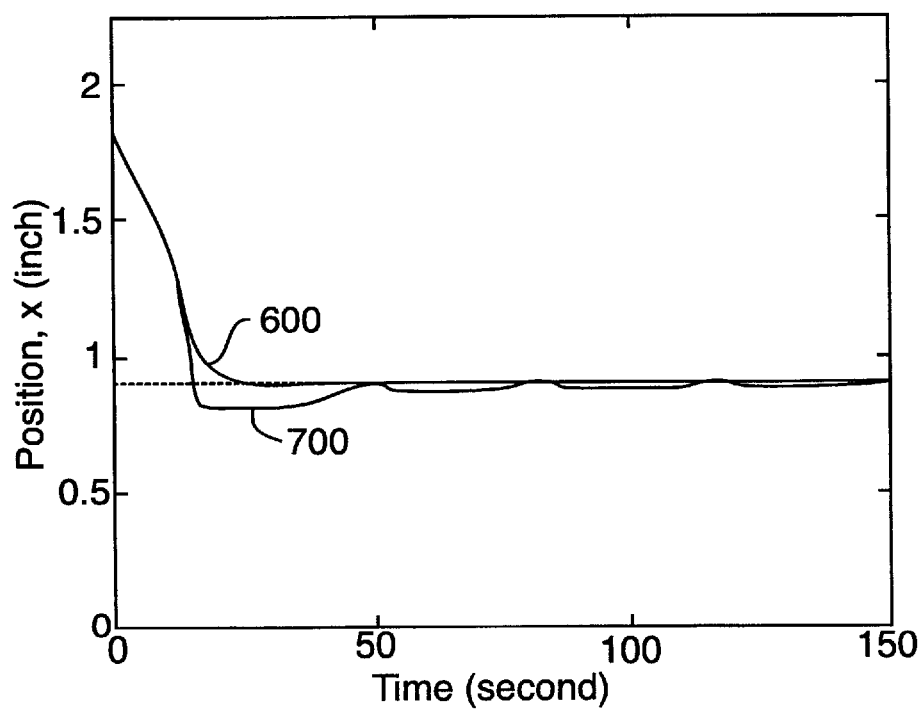
FIG. 6 is a graph illustrating PID controller performance with two different sets of parameters.

On the other hand, it is well known that the performance of a conventional PID controller is very sensitive to gains, and improper tuning results in poor performance and may even produce large fluctuations (instability). This is demonstrated in FIG. 6 which compares the response of the mean flap position under PID control for two different sets of gains for the same test conditions. In case 1 as shown by curve 600, the gains used are $K_p$=3.75, $K_d$=2.5, $K_i$=0.02 which produce good results for this particular step input. In case 2 as shown by curve 700, the gains used are $K_p$=0.0625, $K_d$=14, $K_i$=1, which show much larger fluctuations around the desired or target position $X_d$.

Although the invention has been shown and described in a preferred embodiment, it should be understood that numerous modifications can be made without departing from the spirit and scope of the present invention. Accordingly, the present invention has been shown and described by way of illustration rather than limitation.

What is claimed is:

1. A method of controlling a shape memory alloy (SMA) actuator, comprising the steps of:
   supplying maximum control voltage to an SMA actuator where an object having a position to be controlled by the SMA actuator were to move toward a target position upon supply of non-zero control voltage, and the instantaneous actual position of the object is at a distance above a predetermined threshold from the target position; and
   supplying a variably controlled voltage to the SMA actuator between the maximum voltage and about zero voltage where the object to be controlled were to move toward the target position upon supply of the variably controlled voltage, and the instantaneous actual position of the object is at a distance below the predetermined threshold from the target position.

2. A method of controlling an SMA actuator as defined in claim 1, further including the step of:
   supplying a control voltage of about zero volts to the SMA actuator where the object having a position to be controlled by the SMA actuator were to move away from the target position upon supply of non-zero control voltage.

3. A method of controlling an SMA actuator as defined in claim 1, wherein the step of supplying a variably controlled voltage is defined by the equation:

$$V_c(t) = \left[ K_p(x - x_d^c) + K_d \frac{de}{dt} \right], \; e_{th} > e > 0.$$

4. A method of controlling an SMA actuator as defined in claim 1, further including the steps of:
   periodically predicting a time to reach the target position; and
   cutting off current to the SMA actuator when the time to reach the target position is smaller than a predetermined threshold value, and the instantaneous actual position is at a distance below a low threshold value from the target position.

5. A method of controlling an SMA actuator, comprising the steps of:
- providing an SMA actuator for moving an object to a predetermined target position;
- supplying maximum control voltage to the SMA actuator where an object having a position to be controlled by the SMA actuator were to move toward a target position upon supply of non-zero control voltage, and the instantaneous actual position of the object is at a distance above a predetermined threshold from the target position; and
- supplying a variably controlled voltage to the SMA actuator between the maximum voltage and about zero voltage where the object to be controlled were to move toward the target position upon supply of the variably controlled voltage, and the instantaneous actual position of the object is at a distance below the predetermined threshold from the target position.

6. A method of controlling an SMA actuator as defined in claim 5, further including the step of:
- supplying a control voltage of about zero volts to the SMA actuator where the object having a position to be controlled by the SMA actuator were to move away from the target position upon supply of a non-zero control voltage.

7. A method of controlling an SMA actuator as defined in claim 5, wherein the step of supplying a variably controlled voltage is defined by the equation:

$$V_c(t) = \left[K_p(x - x_d^c) + K_d \frac{de}{dt}\right], e_{th} > e > 0.$$

8. A method of controlling an SMA actuator as defined in claim 5, further including the steps of:
- periodically predicting a time to reach the target position; and
- cutting off current to the SMA actuator when the time to reach the target position is smaller than a predetermined threshold value, and the instantaneous actual position is at a distance below a low threshold value from the target position.

9. An SMA actuator control system comprising:
- an SMA actuator including SMA wires and at least one position sensor, the SMA actuator to be coupled to an object having a position to be moved by the SMA actuator;
- means for supplying maximum control voltage to the SMA actuator where the object having a position to be controlled by the SMA actuator were to move toward a target position upon supply of a non-zero control voltage, and the instantaneous actual position of the object is at a distance above a predetermined threshold from the target position; and
- means for supplying a variably controlled voltage to the SMA actuator between the maximum voltage and about zero voltage where the object to be controlled were to move toward the target position upon supply of the variably controlled voltage, and the instantaneous actual position of the object is at a distance below the predetermined threshold from the target position.

10. An SMA actuator control system as defined in claim 9, further including means for supplying a control voltage of about zero volts to the SMA actuator where the object having a position to be controlled by the SMA actuator were to move away from the target position upon supply of non-zero control voltage.

11. An SMA actuator control system as defined in claim 9, wherein the means for supplying a variably controlled voltage generates the voltage in accordance with the equation:

$$V_c(t) = \left[K_p(x - x_d^c) + K_d \frac{de}{dt}\right], e_{th} > e > 0.$$

12. An SMA actuator control system as defined in claim 9, further including:
- means for periodically predicting a time to reach the target position; and
- means for cutting off current to the SMA actuator when the time to reach the target position is smaller than a predetermined threshold value, and the instantaneous actual position is at a distance below a low threshold value from the target position.

* * * * *

UNITED STATES PATENT AND TRADEMARK OFFICE
CERTIFICATE OF CORRECTION

PATENT NO.    : 6,543,224 B1                                                      Page 1 of 1
DATED         : April 8, 2003
INVENTOR(S)   : Prabir Barooah It is certified that error appears in the above-identified patent and that said Letters Patent is hereby corrected as shown below:

<u>Column 1,</u>
Line 4, before "Field of the Invention" insert:
-- The invention described herein was made in the performance of work under NASA Contract No. NAS3-98005, and is subject to the provisions of Section 305 of the national Aeronautics and Space Act of 1958, as amended (42 U.S.C. 2457). --

Signed and Sealed this

Twenty-third Day of December, 2003

JAMES E. ROGAN
*Director of the United States Patent and Trademark Office*